United States Patent [19]
Hanlon et al.

[11] Patent Number: 5,668,351
[45] Date of Patent: Sep. 16, 1997

[54] CONDUIT HOUSING FOR VEHICLE ENGINE COMPARTMENT HAVING A FLEXIBLE LIP THAT EXTENDS INTO AIRFLOW SEALING ENGAGEMENT WITH THE RADIATION

[75] Inventors: Michael Joseph Hanlon, Oakland Twp.; Dale Anthony Di Bartolomeo; Harry J. Burke, both of Warren, all of Mich.

[73] Assignee: General Motors Corporation, Detroit, Mich.

[21] Appl. No.: 599,229

[22] Filed: Feb. 9, 1996

[51] Int. Cl.⁶ .................................................. H02G 3/00
[52] U.S. Cl. ........................................ 174/68.3; 174/72 A
[58] Field of Search ................. 174/71 R, 72 R, 174/72 A, 95, 101, 68.1, 68.3; 248/65, 68.1, 71

[56] References Cited

U.S. PATENT DOCUMENTS

| | | | |
|---|---|---|---|
| 1,774,071 | 8/1930 | Van Ranst | 280/782 |
| 2,332,855 | 6/1943 | Jones | 248/68.1 |
| 3,494,657 | 2/1970 | Tantlinger et al. | 296/208 |
| 3,622,686 | 11/1971 | Neirinck et al. | 174/97 |
| 3,630,564 | 12/1971 | Ferrara | 296/1.1 |
| 4,227,239 | 10/1980 | Boyer et al. | 361/825 |
| 4,773,496 | 9/1988 | Brielmair | 180/68.4 |
| 4,891,012 | 1/1990 | Pajot | 439/34 |
| 4,937,400 | 6/1990 | Williams | 174/95 |
| 4,943,241 | 7/1990 | Watanabe et al. | 439/34 |
| 5,235,136 | 8/1993 | Santucci | 174/68.3 |
| 5,354,114 | 10/1994 | Kelman et al. | 296/192 |

*Primary Examiner*—Kristine L. Kincaid
*Assistant Examiner*—Kamand Cuneo
*Attorney, Agent, or Firm*—Charles E. Leahy

[57] ABSTRACT

A plastic conduit housing of tubular shape has a wall slit extending the full length of the wall to permit the installation of the electrical harness therein. A mounting leg is formed integrally with the conduit housing and extends into engagement with a vehicle radiator beam to enable mounting of the conduit housing to the beam. A seal lip is also formed integrally with the conduit housing. The seal lip may be flexible and extends into interference with the radiator so that the seal lip is flexed and self-biased into air flow sealing engagement with the radiator.

3 Claims, 3 Drawing Sheets

5,668,351

CONDUIT HOUSING FOR VEHICLE ENGINE COMPARTMENT HAVING A FLEXIBLE LIP THAT EXTENDS INTO AIRFLOW SEALING ENGAGEMENT WITH THE RADIATION

The invention relates to a plastic conduit housing for mounting and protecting an electrical harness routed across a vehicle engine compartment.

BACKGROUND OF THE INVENTION

It is well known in motor vehicles to mount a cooling fan and radiator assembly on a radiator support member which extends crosswise between the side walls of the engine compartment. A beam conventionally extends transversely across the engine compartment atop the radiator to structurally tie together the side walls of the engine compartment. The beam may also be a portion of the radiator support member.

In many vehicles it is necessary to route an electrical harness transversely across the engine compartment and the prior art has recognized the advantage of running the electrical harness either atop or along side the tie beam.

Accordingly, it is known in the prior art to envelop the individual wires of the harness within a conduit, and to then utilize suitable retainers and attaching straps to mount the conduit on the tie beam.

SUMMARY OF THE INVENTION

According to the present invention, a plastic conduit housing of tubular cross sectional shape is provided and has a wall slit extending the full length thereof so that the plastic housing can be pried open to permit the installation of the electrical harness therein. A mounting leg is formed integrally with the conduit housing and extends into engagement with the beam to enable mounting of the conduit housing to the beam. In the preferred embodiment, this mounting leg is preferably integral with and spaced from one of the walls of the conduit housing to define with the conduit housing a cavity by which the conduit housing may be forcibly engaged onto the beam to retain the conduit to the beam. A seal lip is also formed integrally with the conduit housing and extends into air flow sealing proximity with the radiator to substantially block the flow of air which would otherwise bypass the radiator. The seal lip may be flexible and extend into interference with the radiator so that the seal lip is flexed and selfbiased into air flow sealing engagement with the radiator. The conduit housing may be molded in a closed condition so that the conduit housing is pried open to install the electrical harness therein, or, alternatively, the conduit housing may be molded in an open position and the adjacent wall portions defining the slit are respectively provided with a prong and a receptacle for receiving the prong so that the conduit housing may be closed about the electrical harness.

BRIEF DESCRIPTION OF THE DRAWINGS

These and other objects, features and advantages of the invention will become apparent upon consideration of the Description of the Preferred Embodiment and the appended drawings in which.

DESCRIPTION OF THE INVENTION

Figure 1:
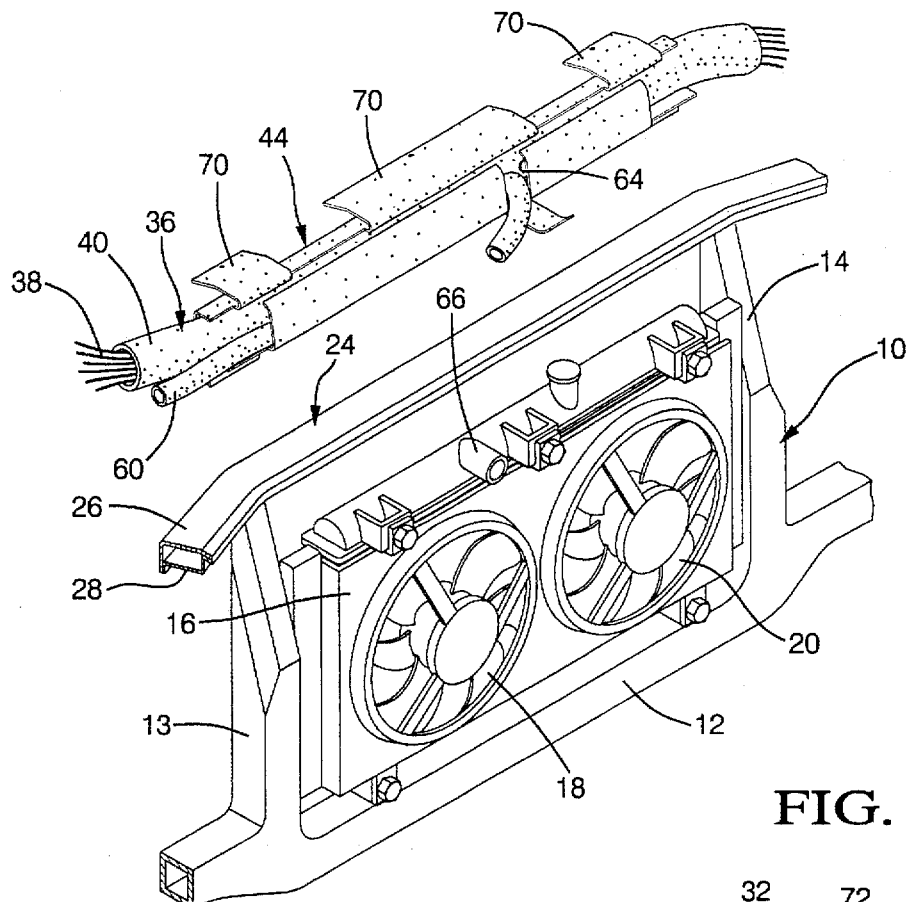
FIG. 1 is a perspective fragmentary view of a vehicle engine compartment showing the invention.

Referring to FIG. 1, there is shown a fragment of a vehicle engine compartment in which a radiator support, generally indicated at 10, includes a lower member 12 and uprights 13 and 14. A radiator 16 is suitably bolted to the radiator support 10 and has a pair of cooling fans 18 and 20 mounted therewith to draw engine cooling air through the radiator 16.

A cross-car tie beam 24 extends across the engine compartment and has its ends suitably attached to the side walls, not shown.

Figure 2:
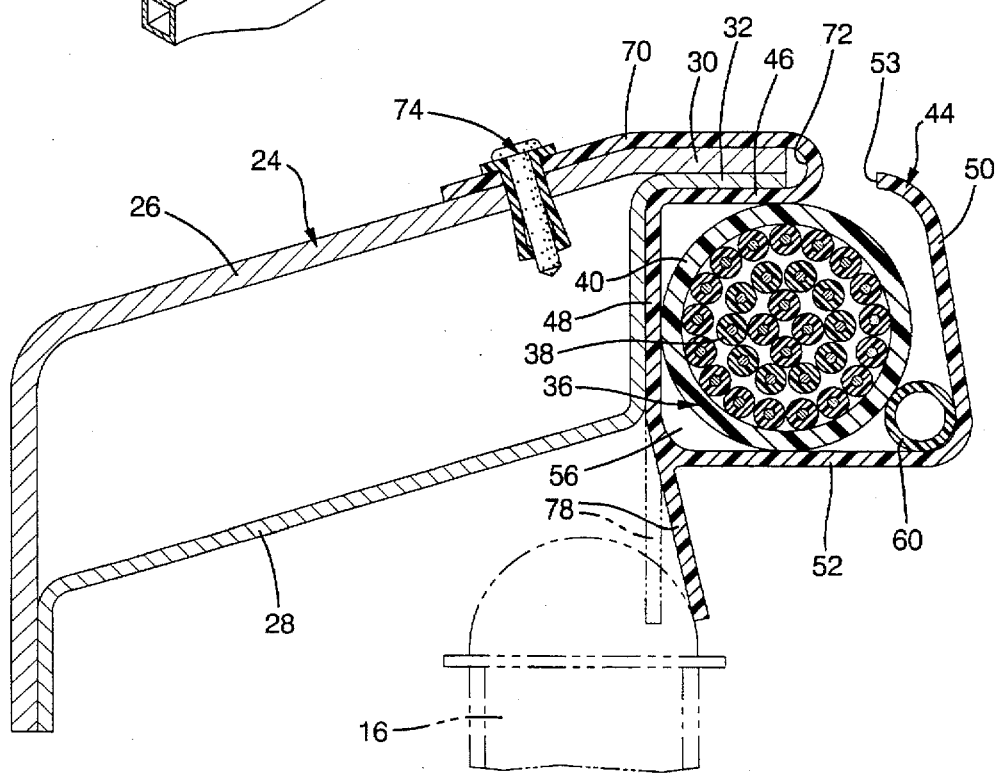
FIG. 2 is a sectional view taken through the beam and the plastic conduit housing of this invention.

As seen in FIG. 2, the tie beam 24 is a box shape defined by welding together a panel 26 and a panel 28 which respectively have flanges 30 and 32 which overlie and are pinch-welded to one another.

Figure 3:
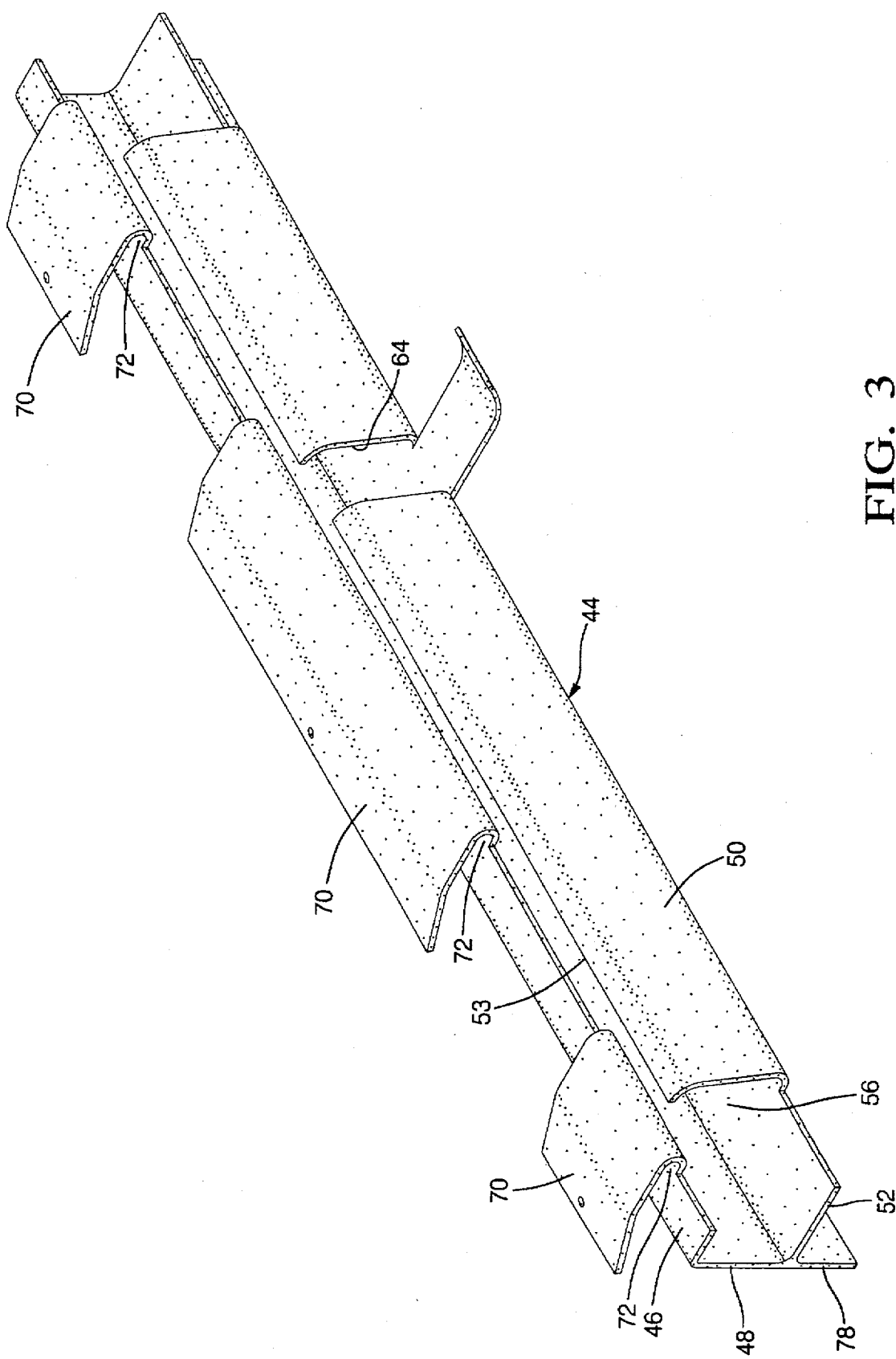
FIG. 3 is a perspective view of the conduit housing.

As best seen in FIG. 1, an wiring harness 36 extends transversely across the engine compartment and includes a bundle of wires 38 contained within a plastic conduit 40. The wiring harness 36 is attached to the cross-car tie beam 24 by a plastic conduit housing, generally indicated at 44. As best seen in FIGS. 2 and 3, the plastic conduit housing 44 is an extruded or molded plastic member of generally quadrilateral cross sectional shape having a top wall 46, front side wall 48, rear side wall 50 and bottom wall 52. These walls are integrally connected together except that a slit 53 is provided between the side wall 50 and top wall 46. The resilient nature of the extruded plastic housing permits the wall 50 to be bent outwardly to permit the installation of the wiring harness 36 into a chamber 56 defined by the walls of the conduit housing 44, and then causes the conduit housing 44 to be self closing to retain the wiring harness 36 therein. As seen in FIGS. 1 and 2, the radiator overflow hose 60 may also be mounted within the conduit housing 44. In this event, an opening is provided in the wall 50 at 64 to permit the hose 60 to be connected with the overflow nipple 66 of the radiator 16.

As seen in FIG. 2, the top wall 46 has a integrally formed, reversibly bent mounting leg 70 which is spaced somewhat above the top wall 46 to define therebetween a cavity 72. The conduit housing 44 is engaged onto the beam 24 by forcing the conduit housing 44 onto the flanges 30 and 32 of the beam 24 so that the flanges 30 and 32 become captured between the wall 46 and the reversibly bent mounting leg 70 of the conduit housing 44. The cavity 72 is preferably dimensioned so that the flanges 30 and 32 are resiliently captured between the wall 46 and 70 to temporarily retain the conduit housing 44 on the beam 24. Then a plurality of suitable fasteners such as rivet assembly 74 are employed to fixedly retain the conduit housing 44 on the tie beam 24.

As best seen in FIGS. 2 and 3, the bottom wall 52 of the conduit housing has an integrally formed sealing lip 78 which extends downwardly therefrom into proximity with the radiator to substantially block the flow of air between the beam 24 and radiator 16, thereby effectively channeling the cooling air through the radiator. As seen in FIG. 2, the seal lip is preferably longer than the distance between the bottom wall 52 and the radiator 16 so that the seal lip 78 flexes from its free state phantom-line indicated position to the solid line indicated installed position upon installation of the conduit housing 44 on to the beam. Accordingly, the seal lip 78 is assured to have a tight air-flow sealing engagement with the radiator 16.

Figure 4:
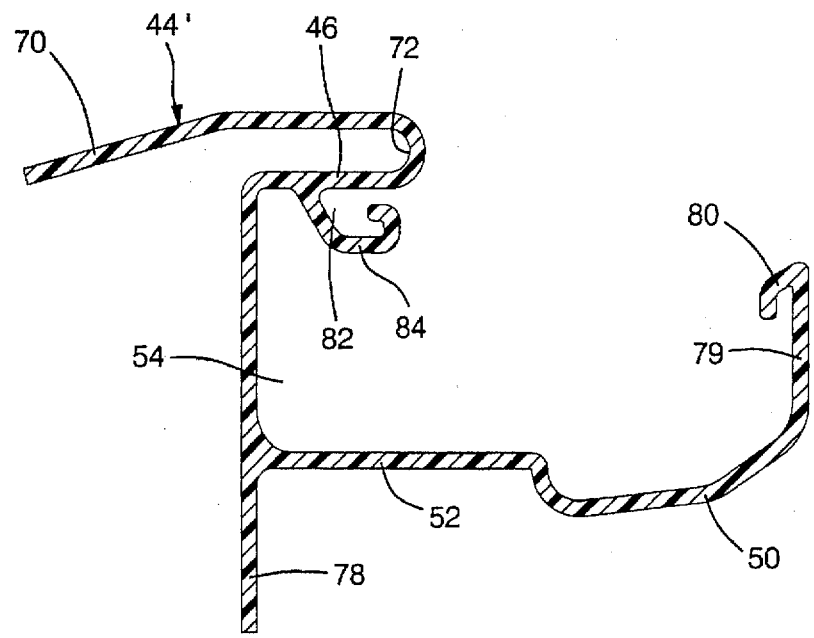
FIG. 4 is a section view through a second embodiment of the conduit housing, shown in an open position.
Figure 5:
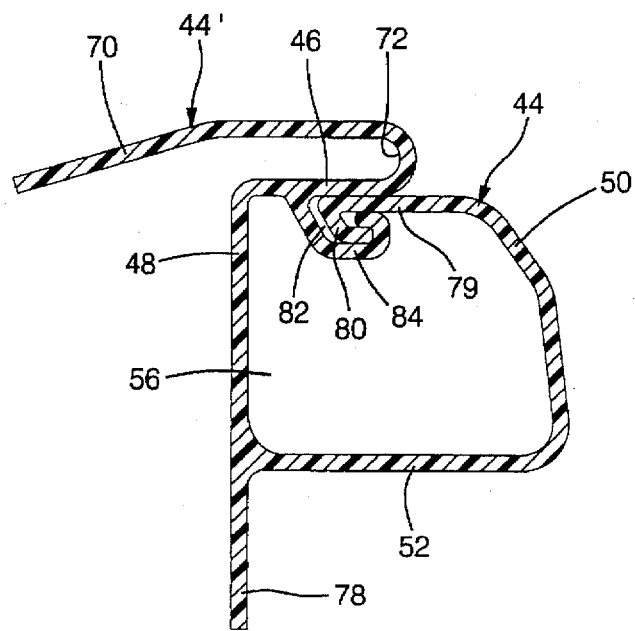
FIG. 5 is a section view showing the second embodiment in a closed position.

FIGS. 4 and 5 show a second embodiment of the conduit housing 44' which is constructed in a fashion generally similar to that of the first embodiment and, accordingly, has its elements identified by the same reference numerals used in relation to the embodiment of FIGS. 1–3. FIG. 4 shows the open as-molded condition of the conduit housing 44' in which the rear wall 50 lies generally open and horizontal so that the electrical harness may be easily installed. This second embodiment includes a positive latch arrangement for closing the conduit housing 44' after the installation of the wiring harness therein. In particular, it is seen that a prong 79 with a hook 80 is molded integral with the rearward wall 50 and a receptacle cavity 82 is defined by a leg 84 molded integral with the top wall 46. As seen in FIG. 4, the prong 79 can be readily snapped into the receptacle 82 to retain the conduit housing 44' in the closed position shown in FIG. 5.

Although the preferred embodiments of the invention include the provision of a sealing lip 78 which is flexible and sufficiently long to interfere with the radiator, it is also within the scope of the invention to employ a more rigid and shorter seal lip which extends into air sealing proximity with the radiator without flexing.

Thus, it is seen that the invention provides a new and improved conduit housing for routing a wire harness across an engine compartment tie beam.

What is claimed is:

1. In a motor vehicle engine compartment having a radiator and a beam extending transversely across the engine compartment above the radiator, a conduit for extending across the engine compartment, to carry an electrical harness, comprising:

a plastic conduit housing of tubular hollow cylindrical shape having a wall opening extending the full length thereof so that the electrical harness can be installed into the conduit housing for retention therein;

a mounting leg formed integrally with the conduit housing and extending into engagement with the beam to enable mounting of the conduit housing to the beam; and an integral seal lip formed integrally with the conduit housing and being flexible and extending into interfering engagement with the radiator so that upon mounting of the conduit housing on the beam, the seal lip is flexed into air-flow sealing engagement with the radiator.

2. The conduit of claim 1 further characterized by having the wall opening thereof provided by a wall slit extending the full length thereof so that the conduit housing can be pried open to permit the installation of the electrical harness therein, and whereby the conduit housing is self closing to retain the electrical harness therein.

3. The conduit of claim 2 further characterized by said wall slit having adjacent portions defining the wall slit and one of said adjacent portions having a prong and another of said adjacent portions having a receptacle for receiving the prong to latch the conduit housing in the closed position.

* * * * *